3,042,485
PREPARATION OF METAL BOROHYDRIDES

Lawrence J. Edwards, Zelienople, Pa., assignor to Callery Chemical Company, Pittsburgh, Pa., a corporation of Pennsylvania
No Drawing. Filed Feb. 25, 1959, Ser. No. 795,315
8 Claims. (Cl. 23—14)

This invention relates to a method of preparing metal borohydrides and more particularly to their preparation from silane $SiH_4$, and metal tetraalkoxyborates.

The metal borohydrides, $M(BH_4)_x$, have found substantial utility as selective reducing agents and as portable sources of hydrogen. Borohydrides are now generally produced from the reaction of saline metal hydrides such as sodium hydride and boron compounds such as trimethyl borate.

It is an object of this invention to provide a new method of preparing metal borohydrides using a new hydridic hydrogen source. A more specific object is to provide a new method of preparing metal borohydrides from the reaction of silane and a metal tetraalkoxyborate. Other objects will become apparent from description and claims hereinafter related.

In the practice of this invention, the metal borohydride is produced by contacting silane and metal tetraalkoxyborate in the presence of an inert solvent for the tetraalkoxyborate. The reaction proceeds readily according to the equation

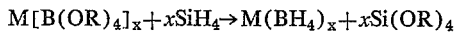

$$M[B(OR)_4]_x + xSiH_4 \rightarrow M(BH_4)_x + xSi(OR)_4$$

where M is a metal, $x$ is the valence of the metal, and R is a lower alkyl radical. This method may be used to prepare any of the metal borohydrides such as, for example, alkali metal borohydrides such as sodium borohydride, lithium borohydride, and potassium borohydride; alkaline earth metal borohydrides such as magnesium borohydride and calcium borohydride; aluminum borohydride; and heavy metal borohydrides such as zinc borohydride, titanium borohydride, and thorium borohydride.

Any of the metal lower tetralkoxyborates may be used in this reaction, such as metal tetramethoxyborates, metal tetraethoxyborates, metal tetrapropoxyborates, metal tetrabutoxyborates, and alkoxyborates with different alkoxy groups, e.g. sodium tripropoxybutoxyborate. The tetraalkoxyborates may be formed in situ if desired from a metal alkoxide and a trialkylborate; for example, sodium tetramethoxyborate is formed in situ from sodium methoxide and trimethylborate. Sodium tetramethoxyborate is now a preferred reactant for preparing sodium borohydride since it is available as a by-product from other processes.

The reaction proceeds readily in any solvent that is inert to the reactants and reaction products. Suitable solvents include ammonia, amines, and ethers. When using ether solvents it is generally preferred to perform the reaction at less than about 100° C., since at higher temperatures the silane tends to react with ethers, which results in some loss of silane and contamination of the product.

When the solid borohydrides are being produced it is preferred to use a solvent in which the product borohydride is substantially insoluble, since it may then be easily separated from the reaction mixture by filtration or other conventional solid-liquid sepraation methods. Thus preferred solvents for reactions producing sodium borohydride include tetrahydrofuran, ethyleneglycoldimethyl ether, and diethyleneglycol diethylether, and preferred solvents for reactions producing potassium borohydride include tetrahydrofuran, and polyethyleneglycol ethers of the formula $R-O(CH_2-CH_2-O)_n R$ where $n$ is a number from 1 to 4 and R is a lower alkyl radical.

If the product borohydride is soluble in the reaction solvent, or reaction mixture, the borohydride may be separated by crystallization, salting out, evaporation of the solvent, or other conventional methods. The liquid borohydrides, such as aluminum borohydride may conveniently be separated by distillation.

Borohydride solutions are frequently used in organic and inorganic reductions, so the solutions prepared by this invention may be used directly without separating the borohydride. For example, solutions of lithium borohydride, calcium borohydride and magnesium borohydride may be made by reaction of the appropriate tetraalkoxyborate and silane using solvents such as ethyl ether, tetrahydrofuran, and polyethyleneglycol ethers.

The following example is illustrative of the practice of this invention. 4.56 millimoles of sodium tetramethoxyborate, 12.14 millimoles of silane and 2.4 milliliters of solvent ethyleneglycoldimethyl ether were charged to a tube in a nitrogen atmosphere. The tube was sealed and allowed to remain at reflux temperature, approximately 60° C., for about sixty-six hours. The tube was then opened into a conventional vacuum distillation train; the volatile products were separated and analyzed and found to consist of 7.11 millimoles of unreacted silane, 2.77 millimoles of methyl silicate and 1.02 millimoles of hydrogen. The hydrogen is believed to result from reaction of hydridic hydrogen from silane or its reaction products with hydroxyl impurities in the solvent. The slurry left in the tube was filtered to separate the solid reaction product. This product contained hydridic hydrogen and boron and sodium in approximately a 4:1:1 ratio, and was further identified as sodium borohydride by infra red and x-ray spectrum analysis. The filtrate consisted essentially of solvent ether; it contained no unreacted sodium tetramethoxyborate, but did contain some dissolved methyl silicate. The 1.02 millimoles of hydrogen produced is equivalent to consumption of 0.26 millimole of silane by reaction with impurities. Thus 4.52 millimoles of silane and 4.56 millimoles of sodium tetramethoxyborate were consumed in the borohydride producing reaction, which demonstrates the stiochiometry of the reaction.

Silane reacts explosively upon exposure to air, so it is necessary to perform the reactions in the absence of air. This may be accomplished by the use of a vacuum, or preferably, by use of a nonoxidizing cover gas such as nitrogen, argon or hydrogen.

According to the provisions of the patent statutes, I have explained the principle and mode of practicing my invention, have described what I now consider to be its best embodiments. However, I desire to have it understood that within the scope of the appended claims, the invention may be practiced otherwise than as specifically described.

I claim:
1. A method of preparing a borohydride of a metal selected from the group consisting of alkali metals, alkaline earth metals, aluminum, zinc, titanium and thorium which comprises the step of contacting a tetralkoxyborate of the said metal with silane in the presence of an iert solvent for the said tetraalkoxyborate said solvent being selected from the group consisting of ammonia, amines and ethers, and recovering the metal borohydride formed.

2. A method according to claim 1 in which the borohydride formed is substantially insoluble in the solvent.

3. A method according to claim 1 in which the solvent is an ether.

4. A method according to claim 1 in which the silane is in excess of stoichiometric.

5. A method of preparing an alklai metal borohydride which comprises the step of contacting an alkali metal tetralkoxyborate said solvent being selected from the group consisting of ammonia, amines and ethers with silane in the presence of an inert solvent for the tetralkoxyborate, and recovering the borohydride formed.

6. A method of preparing potassium borohydride which comprises contacting a potassium tetraalkoxyborate with silane in the presence of a polyethyleneglycoldialkyl ether and recovering the borohydride produced.

7. A method of preparing sodium borohydride which comprises contacting a sodium tetraalkoxyborate with silane in the presence of a solvent selected from the group consisting of tetrahydrofuran, ethyleneglycoldimethyl ether, and diethyleneglycol diethyl ether and recovering the borohydride formed.

8. A method according to claim 6 in which the tetraalkoxyborate is tetramethoxyborate.

References Cited in the file of this patent

UNITED STATES PATENTS 2,741,540   Brogdon et al. _____ Apr. 10, 1956

FOREIGN PATENTS 945,625   Germany _____ July 12, 1956

OTHER REFERENCES

Schaeffer et al.: "Journal of the American Chemical Society," vol. 78, page 727 (1956).

Lappert: "Chemical Reviews," vol. 56, pages 974–976, October 1956.

Hurd: "Chemistry of the Hydrides," 1952, pages 84 and 109.

Wiberg: "New Results in Preparative Hydride Research," AEC-tr-1931, Apr. 8, 1954, page 23.

Schaeffer et al.: "Journal of the American Chemical Society," vol. 79, page 727 (1957).

Peake et al.: "Journal of the American Chemical Society," vol. 74, pages 1526–1528 (1952).

UNITED STATES PATENT OFFICE
CERTIFICATION OF CORRECTION

Patent No. 3,042,485                            July 3, 1962

Lawrence J. Edwards

It is hereby certified that error appears in the above numbered patent requiring correction and that the said Letters Patent should read as corrected below.

Column 2, line 71, to column 3, line 4, should appear as shown below instead of as in the patent:

> 5. A method of preparing an alkali metal borohydride which comprises the step of contacting an alkali metal tetralkoxyborate with silane in the presence of an inert solvent for the tetralkoxyborate said solvent being selected from the group consisting of ammonia, amines and ethers, and recovering the borohydride formed.

Signed and sealed this 6th day of November 1962.

(SEAL)
Attest:

ERNEST W. SWIDER                         DAVID L. LADD
Attesting Officer                          Commissioner of Patents